Patented Sept. 26, 1933

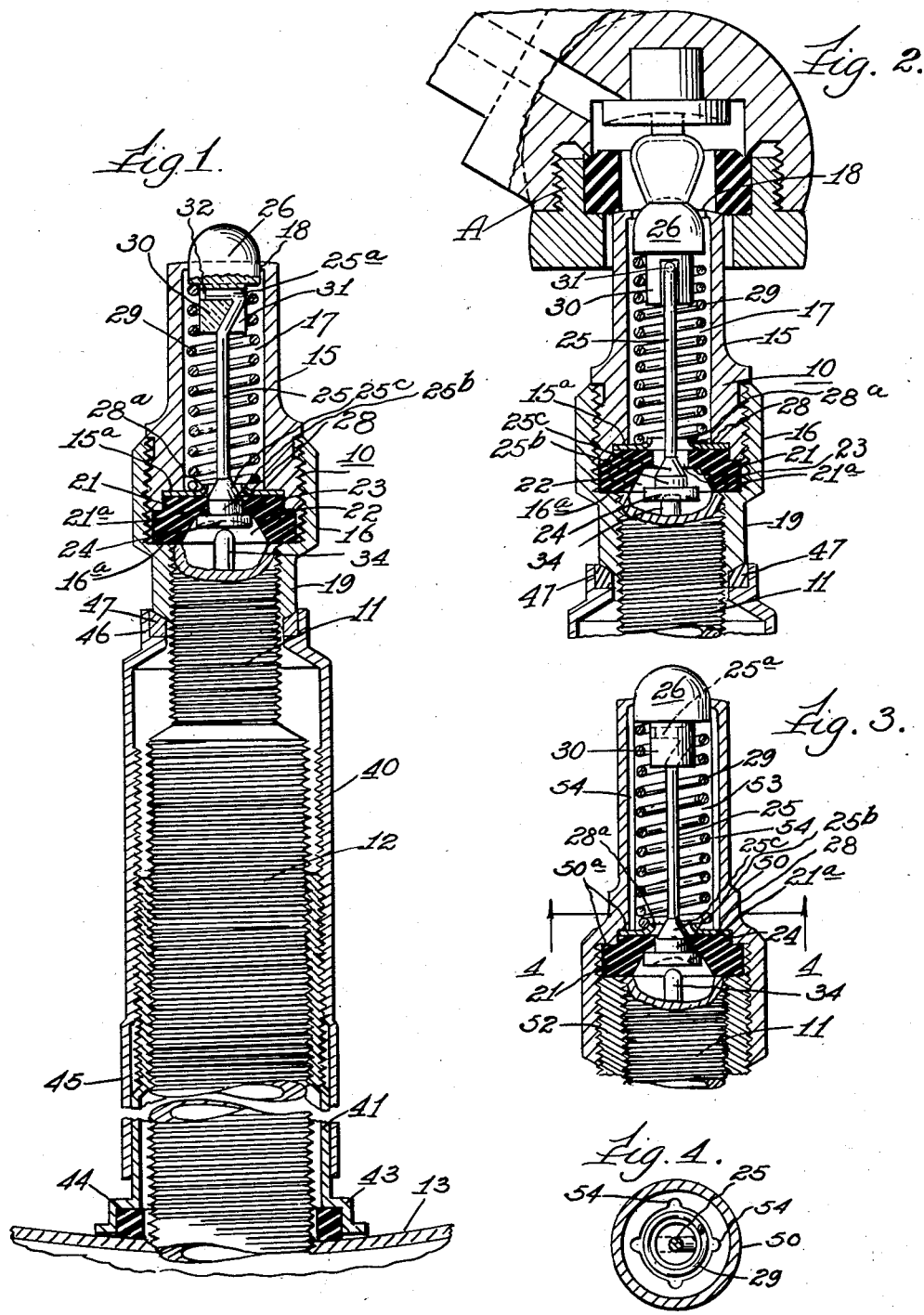

1,928,069

UNITED STATES PATENT OFFICE 1,928,069

AUXILIARY TIRE VALVE

Emmett B. Moore, Evanston, Ill.

Application February 6, 1931. Serial No. 513,891

4 Claims. (Cl. 152—12)

This invention relates to inflation valves for pneumatic tires and other devices adapted to be filled with compressed air. More particularly the invention has reference to an improved auxiliary valve device adapted to be secured on the upper end of the inflation-valve casing, and serving to protect the valve by excluding dust and dirt; the device preferably being constructed and formed to receive a conventional type of air pressure gauge, or chuck, for supplying air directly to the tire or other device through the auxiliary valve, without necessitating the removal or adjustment of an exterior protecting dust cap such as is now commonly employed to enclose the upper end of a tire-valve casing.

The main object of this invention is to provide an improved auxiliary valve device that is simple, durable and compact, and constructed and arranged to exclude dirt, dust and moisture from entering the tire-valve casing while being effective and efficient in operation and being capable of economical manufacture. Another object is to provide an improved device of this character having a movable element normally sealing the inlet opening of the auxiliary valve casing and arranged to impart motion to the valve in the tire-valve casing and causing opening of the same to admit air for inflating the tire, or for discharging air therefrom in testing the amount of air pressure in said tire in the conventional manner. A further object is to provide an improved auxiliary valve device of relatively few parts, and which is constructed to expedite assembly thereof, and also to permit convenient dis-assembly for replacement of its valve seat or other valve elements. And a still further purpose of the invention is to provide an improved construction adapted to act as a check valve for safe-guarding the tire against loss of air in the event of leakage of the valve in the tire-valve casing. With these and other objects and advantages in view, the invention consists in certain elements and features of construction herein shown and described, as indicated by the claims.

In the drawing:

Figure 1 is a vertical longitudinal sectional view of an auxiliary valve device embodying the present invention, shown applied to a conventional tire-valve casing.

Figure 2 is a sectional view of the device with a conventional air hose chuck applied thereto and showing the device in operating position for admitting air into the tire.

Figure 3 is a longitudinal sectional view of a modified construction.

Figure 4 is a transverse section taken substantially as indicated at line, 4—4, on Figure 3.

For the purpose of illustration I have shown my improved auxiliary valve device applied to a tire-valve casing and it is to be understood that the device is capable of use with various other apparatus. I am aware of a number of attempts to devise a practical structure of this general character, many of which have proved unsuccessful commercially because of peculiarities in their construction which necessitated the use of special chucks on air hoses, and in other instances because the devices were inefficient and too complicated. With this as a background I have attempted to provide a construction which will not meet with the difficulties heretofore experienced by the prior art constructions.

Referring now in detail to the drawing, my improved auxiliary valve device indicated generally at 10, is shown threaded on the upper reduced portion, 11, of a conventional tire-valve casing, 12, which, as shown, in Figure 1 projects upwardly through the felly, 13, of the wheel. The construction includes a two-part tubular casing, as indicated at 15 and 16; the upper part, 15, being provided with a substantially straight annular bore, 17, and the extreme upper end of said casing part, 15, being formed with an inlet port, 18, of a diameter substantially smaller than the cross-sectional bore of said casing part, 15. The casing parts, 15 and 16, are formed for threaded engagement with each other, which facilitates assembly of the valve mechanism in said casing, while also permitting quick dis-assembly for removal of the valve mechanism for examination and replacement of parts. The lower portion, 16, of said casing is formed with a downwardly extending sleeve, 19, which is internally threaded to fit the upper end of the reduced portion, 11, of the tire-valve casing. Firmly secured between opposed shoulders, 15ª and 16ª, of the respective casing parts is an annular valve seat element, 21, which may be formed of any suitable material, preferably of a resilient nature, such as rubber.

The valve seat element, 21, is dimensioned and so located in the casing as to engage the upper edge of the tire-valve casing when the auxiliary valve device is mounted thereon, so as to form an air-tight seal for passage of the air into the tire, and also preventing air leakage. The under side of this valve seat element is formed with a centrally located annular recess or well, 22, the bottom of which is formed as a transverse shoulder, 23, serving as the valve seat proper for a reciprocatory valve element, 24, secured to the lower end of a stem, 25, which extends upwardly through the centrally located valve port, 21ª. The wall of said well, 22, is of cone formation, insuring maximum strength of the valve seat element, while insuring an ample passageway for the air to pass into the tire when the valve, 24, is in open position. The lower end of the stem on the upper side of the valve 24, is enlarged as indicated at 25ᵇ, and substantially occupies the port, 21ª, when the valve is closed, and the upper end of said enlargement is tapered as at 25ᶜ, so as to assist in guiding and maintaining the valve centered with respect to its seat.

The upper end of the stem is firmly and detachably secured to a head, 26, the outer end of which is of hemispherical form and is dimensioned to be freely movable through and to substantially occupy the entire area of the inlet port opening, 18, in the top of the casing part, 15. By forming the portion of the head, 26, which projects upwardly through and beyond the top of the casing part, 15, of hemispherical form, it is adapted to deflect moisture and dirt, and any accumulation on the top of the fixture may be quickly removed by merely rubbing it with the finger or a polishing cloth.

Disposed on the upper flat surface of the valve seat element, 21, is a metal annular reinforcing element, 28, which is held in position by its marginal edges being firmly engaged by the shoulder, 15ª, of the upper casing part, and the valve seat element, and serves to provide a seat for the lower end of a coil spring, 29, which circumscribes the stem. The inner edge of said annular element is formed with an upstanding flange, 28ª, for centering the spring about the stem. This reinforcing element serves to prevent distortion of the valve seat by the high air pressure acting against the under side thereof. The upper end of the spring reacts against the under side of the head, 26, and snugly fits about the reduced shank, 30, of said head. For convenience in assembly the valve head, 26, and stem are disengageable, and for this purpose the shank portion, 30, of the head is formed with a longitudinal groove or slot, 31, which terminates into a transversely extending aperture, 32, in which is adapted to be seated a bent portion, 25ª, of the upper end of the valve stem, 25. By virtue of this connection the end of the stem is disposed entirely within the shank, 30, and the snug fit of the coil spring, 29, thereabout maintains the connection between the stem and the head.

The depth of the well, 22, in the under side of the valve seat element and the dimensions of the valve proper, 24, are such that said valve is normally positioned immediately over and in spaced relation to the end of the stem, 34, of the valve in the tire-valve casing. By depressing the head, 26, as for example, in a manner indicated in Figure 2, by engagement with the conventional type of chuck indicated generally at A, the valve, 24, is moved away from its seat, opening the port, 21ª, and is then caused to engage the end of stem, 34, of the tire valve, to move it downwardly for opening the valve in said tire-valve casing so that there is continuous open passageway through the auxiliary valve device, and the tire-valve casing either for the admission of air into the tire or to permit discharge therefrom. The head, 26, is freely movable through the port opening, 18, and thus when it is released and the coil spring, 29, is permitted to come into play for moving the valve, 24, to its seat, the rounded portion of the head is projected exteriorly through the top of the casing part, 15, and thus substantially seals it against dust and dirt, moisture, etc. This construction also serves to afford accommodation for wear on the valve seat element; that is, if the valve seat element or the valve, 24, wear down from use, the spring takes up this wear and the head, 26, is projected up through the casing a little further, so that the valve at all times will tightly engage its seat. It will be manifest that by forming the casing, 10, in two parts it permits convenient assembly and dis-assembly and expedites replacement of the valve seat element or any other element of the valve mechanism, if occasion arises, since the entire valve assembly may be bodily removed. Because the valve seat element, 21, is of resilient material, it may be quickly snapped on and off over the valve element, 24, and this feature is considered relatively important, since it permits quick replacement of a valve seat if it becomes necessary, and even when the valve seat is removed the remaining elements of the valve assembly will be retained in assembled relation by virtue of the spring acting against the metal washer, 15ª, which will be caused to abut against the upper side of the valve head. The external diameter of the upper end of the casing part, 15, is substantially the same as the diameter of the reduced portion, 11, of the tire valve casing, so as to permit its being used with all conventional types of chucks for air hoses and also with all standard tire gauges for ascertaining the air pressure in the tire.

It is obvious that my improved valve device may be satisfactorily employed for use as the sole inflation valve for pneumatic tires and the like, and will thus effect a substantial saving of material. To adapt my valve device for such use merely requires forming the sleeve, 19, of the lower casing part, 16, of proper size and shape for connection to form the inner tube of the tire in substantially the same manner as the conventional tire-valve casing now commonly employed.

A further feature of the present invention resides in the provision of a novel dust cap for the main portion of the tire-valve casing. As indicated in Figure 1, this improved dust cap includes two telescopically engageable tubular elements, 40 and 41, which are internally threaded for adjustment longitudinally of each other. The innermost or lower element, 41, is also threaded internally for threaded engagement on the exterior of the tire-valve casing, and its lower end is provided with an offset flange, 43, in which is seated a resilient gasket, 44, for tightly engaging against the felly, 13, of the wheel, and thereby in effect, insulating the dust cap, 40, from the wheel. The upper portion, 40, of the dust cap is preferably formed with an offset skirt, 45, at its lower end which normally extends almost to the offset flange, 43, of the lower and innermost element, 41, so as to give a neat appearance and complete enclosure, sealing the tire-valve casing from dirt, moisture, etc. This construction has the advantage of permitting adjustment to accommodate different length of extension of the tire-valve casings through the felly of the wheel. The extreme upper end of the part, 40, is flared to an annular recess, 46, in which is seated a resilient gasket, 47, which is adapted to abut tightly against the lower edge of the lower casing part, 16, of the auxiliary valve device when the upper part, 40, is screwed upwardly so that the dust cap portion, 40, will act somewhat as a lock nut to secure the auxiliary valve device on the tire valve casing. For removal of the auxiliary valve device (which is only necessary when removing the tire from its wheel or the rim), the upper part, 40, is screwed downwardly on the inner part, 41, so as to disengage and release the auxiliary valve device.

Figures 3 and 4 illustrate a somewhat modified form of the invention, and as may be seen in Figure 3, the exterior casing indicated at 50, is made in substantially a single piece and the removable valve seat element, 21, is firmly locked therein against the shoulder, 50ª, by an internally threaded bushing, 52, at the lower end, which itself is internally threaded for engagement on the reduced portion, 11, of the tire valve casing. The internal bore, 53, of the casing is somewhat smaller than shown in the construction illustrated in Figures 1 and 2,—that is, the bore is of substantially the same diameter as the head, 26, and in order to provide for air passageway between the air inlet port, 18, and the valve port, 21ª, the inner wall of the casing is formed with a plurality of longitudinally extending grooves indicated at 54 which terminate adjacent the valve element and the upper end of the casing adjacent said port, 18, so that when the head, 26, is depressed into the casing, in opening movement of the valve, there is provided a continuous passageway for either the admission or discharge of air through the axiliary valve device. The construction and operation of the device shown in Figures 3 and 4 is otherwise substantially the same as that described for the construction shown in Figures 1 and 2.

Although I have shown and described a particular embodiment of the present invention, I do not wish to be understood as limiting myself to the invention as disclosed, except as indicated by the appended claims.

I claim:—

1. A valve device including a casing formed with an inlet port at one end and a reciprocable valve mechanism in the casing, including a stem with a valve element adjacent one end and a detachable head formed with a reduced shank, the stem having a transverse terminal portion engaging a transverse aperture in the shank, and means removably encircling said shank portion serving to retain the end of the stem therein.

2. A valve device including a casing and a reciprocable valve mechanism disposed in said casing and including a stem with a valve element adjacent one end of the stem, and a head detachably connected to the other end, the casing having an inlet port normally occupied by said head of the stem and through which said head is freely movable, the head including a reduced shank, and the stem having a transverse extension projecting into an aperture in the shank for detachably connecting said parts, and a coil spring circumscribing said shank for maintaining the assembly of the head and stem and serving normally for holding the valve to its seat.

3. A tire valve device including a casing with two tubular members separably connected end to end, with a reciprocable valve mechanism assembled as a unit, said unit consisting of a valve rod, a resilient washer through which the rod extends, a valve element adjacent one end of the rod adapted to seat against the washer normally to prevent escape of air therethrough, a terminal portion on the other end of the rod projecting externally from the casing, a spring on the rod reacting between the washer and said terminal for seating the valve, said unit mechanism being held in the casing by engagement of the marginal portion of said resilient washer between opposing shoulders of the casing members so that disconnection of said members frees the valve mechanism for removal therefrom as an assembled unit, and a metallic disk overlying the resilient washer to receive the reaction of the spring and extending over the marginal portion of said washer for direct engagement with the casing shoulder to prevent undue deformation of the washer by the pressure of the shoulder or the pressure of the spring.

4. In combination, a valve cap for tire valve stems adapted to seal a valve stem when applied thereto, said cap comprising a hollow metallic part internally threaded to screw onto the threaded nipple of the valve stem and containing a resilient sealing washer and an auxiliary valve, a valve stem having external threads extending for a substantial distance below the portion to which said cap is applied, and a cover sleeve for the valve stem provided with internal threads positioned to engage said lower threaded portion of the stem, the upper end of the sleeve being formed to abut the lower end of the cap when the sleeve is screwed upwardly along the stem for frictionally locking the cap on the stem, the sleeve releasing its frictional hold upon being screwed downwardly along the stem.

EMMETT B. MOORE.